M. C. Root,
Making Stove-Pipe.
Nº 17,393. Patented May 26, 1857.
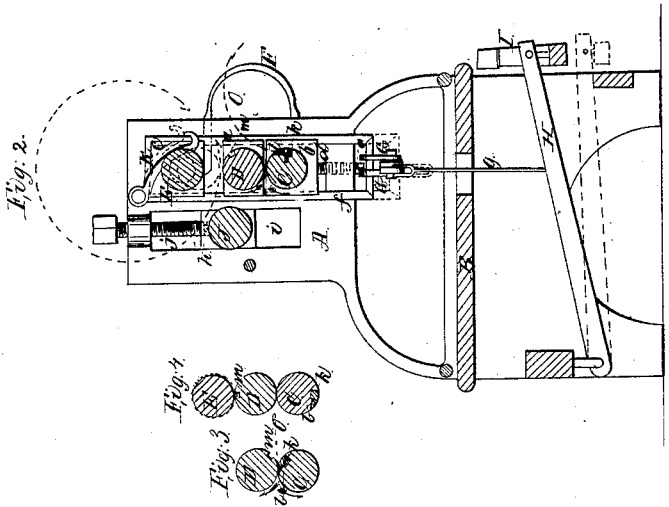
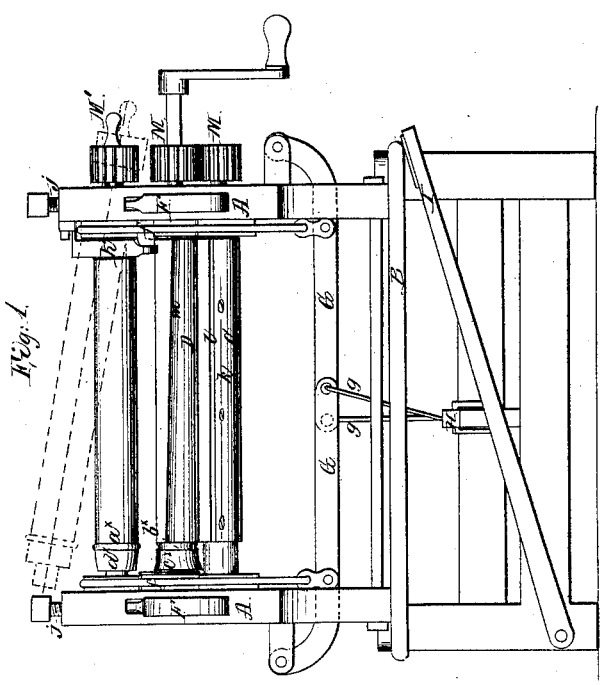

UNITED STATES PATENT OFFICE.

M. C. ROOT, OF TOLEDO, OHIO.

IMPROVEMENT IN MACHINES FOR MAKING STOVE-PIPE.

Specification forming part of Letters Patent No. 17,393, dated May 26, 1857.

*To all whom it may concern:*

Be it known that I, M. C. ROOT, of Toledo, in the county of Lucas and State of Ohio, have invented a new and Improved Machine for Making Stove-Pipe; and I do hereby declare that the following is a full, clear, and exact description of the same, reference being had to the annexed drawings, making a part of this specification, in which—

Figure 1 is a front view of my improvement. Fig. 2 is a transverse vertical section of the same, the plane of section being through the center. Figs. 3 and 4 are transverse sections of the rollers of the machine.

Similar letters of reference indicate corresponding parts in the several figures.

This invention consists in the arrangement and combination together of the edging, forming, swaging, grooving, and contracting rollers; also in giving a spiral form to the groove of one of the swaging-rollers.

To enable those skilled in the art to make and use my invention, I will proceed to describe its construction and operation.

A A represent two cast-metal heads, which are secured to a proper bench, B, and C D E are three wrought-iron rollers the bearings of which are fitted in the heads A A. The bearings $a$ of the roller D are fitted permanently in the heads A, but the bearings $b\ c$ of the rollers C E are fitted in slots or openings $d$ in the heads. The bearings $b$ of the roller C rest on set-screws $e$, and the roller C may be adjusted nearer to or farther from the roller D by regulating or operating the screws $e$. The bearings $c$ of the roller E rest upon springs F. The bearings $c$ have each a metal strap or rod, $f$, passing around them, and the lower ends of these straps are connected to levers G G, the inner ends of which are connected by rods $g$ to a lever, H, underneath the bench B, said lever H being connected to a treadle, I.

J represents a wrought-iron roller. The bearings $h$ are fitted in slots $i$ in the heads A, the slots $i$ being directly back of the slots $d$. The bearings $h$ are allowed to slide up and down in the slots $i$, and these bearings $h$ are operated or adjusted by screws $j$. The upper roller, E, has a long journal at one end, so that said roller may slide in its bearings, and the roller is kept in proper place or position by a drop, K, which is attached to the inner side of one of the heads A.

To the periphery of the lower roller, C, a steel strip or plate, $k$, is attached, said plate or strip extending the whole length of the roller C. A groove, $l$, is formed in the roller just back of the plate $k$, as shown clearly in Figs. 2, 3, and 4.

In the periphery of the roller D a spiral groove, $m$, is made. This groove extends the whole length of the roller D, as shown clearly in Fig. 1.

On one end of the roller D a crank, L, is attached, and the rollers C D are connected at one end by gear-wheels M. The roller E has a toothed wheel, M', at one end, said wheel gearing into the wheel M of the roller D when the roller E is depressed.

On the roller E, at one end, a bead, $a^*$, is formed, and a concave groove, $b^*$, is formed in the corresponding end of the roller D. This end of the roller D is also gradually enlarged, as shown at $c^*$, and the corresponding end, $d^*$, of the roller E is correspondingly diminished in diameter. (See Fig. 1.)

The operation of the machine is as follows: The metal plates are got out of the proper size, and a plate, O, is grasped by the attendant or operator and one edge inserted in the groove $l$, behind the plate or strip $k$. Motion is then given the roller C D in the direction indicated by arrows 1, and the edge of the plate O is bent, as shown clearly in Fig. 3. The plate is then detached or removed from between the rollers C D, and the opposite edge is inserted in the groove $l$, the plate O being reversed. The plate is again removed from between the two rollers C D, each end, by the operation described, being bent over at opposite sides, as shown clearly in Fig. 3. The plate O is now placed between the rollers D E, and the roller E is brought in contact with the plate O on the roller D by depressing the lever I with the foot, and the roller J is adjusted by turning the screws $j$, so that as the rollers E D are turned the plate O will be guided so as to be bent in circular form. (See dotted circle in Fig. 2.) By adjusting the roller J higher or lower the diameter of the pipe may be varied as desired. When the plate O is bent in cylindrical form, the bent edges are locked together, and the seam or joint is placed in the groove $m$, and as the rollers E D are again turned the seam will be closed and made perfectly tight. In consequence of the groove $m$ being of slight spiral form, the pressure upon the whole of the seam is not instantaneous, but acts gradually from one end of the seam to the other, thereby causing the seam to be more fully or perfectly closed by insuring each part or point along the whole length of the seam to be subjected to a requisite pressure to effect the desired purpose. When the seam is closed, the pipe is moved along to the end of the roller E, and is beaded by the projecting bead $a^*$ on the roller E and the concave $b^*$ in the roller D, and as the end of the roller D at $c^*$ is enlarged gradually in diameter and the corresponding end, $d^*$, of the roller E gradually diminished in diameter, the end of the pipe will be contracted and also beaded, the contracted end being necessary to allow its insertion in the adjoining pipe or length. The pipe thus completed is removed from the roller E by raising the drop K and shifting the roller E in its bearings so that one end may be raised, as shown in red, Fig. 1, and the pipe removed.

Five different operations are done by my machine—viz., turning the edges of the metal sheet, forming the pipe, swaging or closing the lock, grooving or beading the pipe, and contracting and expanding the ends thereof.

In all the best tin and sheet-iron manufactories in this country, so far as I am aware, five distinct machines are at present required to perform the above operations. Five different handlings and changes from one machine to the other are therefore necessary, whereby much loss of time is occasioned.

My machine is not simply a combination into one frame of the five different machines heretofore used. It is true that I use rollers and grooves for forming the lock, curving the pipe, &c., and that the pipe when finished presents the ordinary appearance; but the arrangement and combination of rollers seen in my machine is, to the best of my knowledge and belief, novel.

It is not new to combine three rollers similar to the combination of my rollers D E J for the purpose of forming the pipe. An example of such a combination may be seen in the patent of W. James, April 11, 1826, and I disclaim such combination; but the combination of one of the rollers of the above set, D, with an edging-roller, C, or, in other words, making the roller D to perform a double function—viz., that of a forming-roller, in combination with the rollers E J, and that of an edging-roller, in combination with roller C—is a new feature in machines of this description.

It is not new to combine two rollers like my rollers C D for the purpose of turning the edges for the lock of the sheet. An example of such a combination is seen in C. C. Fisher's patent, 1833, and I disclaim the same; but the combination of one of such a pair of rollers, D, with two forming-rollers, E J, as described, is a new combination.

I do not claim, broadly, the swaging or closing of the lock by means of two rollers, one of which is grooved; but it is common to arrange the groove which receives the lock straight, and this involves the employment of great power at the moment of closing the lock.

By arranging the groove $m$ spirally, as in my machine, the lock only requires for its closing but little power, as it is done gradually, and not instantly. The lock is also better and more firmly closed than by the old plan. Giving to the rollers D E the function of swaging-rollers, in addition to their other offices, is also new, I believe.

I am aware that it is old to employ a pair of rollers to groove and bead the pipe, one of said rollers having a concave groove and the other a corresponding bead, similar to the groove $b^*$ and bead $a^*$ in my machine; but I believe it is new to combine said groove $b^*$ and bead $a^*$ with rollers that perform, respectively, the several functions pertaining to my rollers D E. Nor is it new to enlarge and contract the ends of the pipe by means of a pair of rollers furnished with conical surfaces, like the surfaces $c^*$ $d^*$ in my machine; but I believe it is new to have such surfaces upon rollers that have the further functions of my rollers D E.

So far as I am aware, no machine similar to mine has ever been known or used. It forms a new combination, producing highly useful results.

Three separate rollers have hitherto been required to form the pipe—two to turn the edges, two to swage or fasten the lock, two to produce the bead, and two to expand and contract the ends—in all eleven distinct rollers distributed into five separate machines.

A single machine of my improved construction, with only four rollers, performs in less time all the work that can be done by one person aided by all the above machines.

What I claim as new, and desire to secure by Letters Patent, is—

1. The arrangement and combination together of the edging, grooving, forming, swaging, and expanding and contracting rollers C D E J $a^*$ $b^*$ $c^*$ $d^*$, as described.

2. Giving a spiral form to the groove $m$ of roller D, as set forth.

M. C. ROOT.

Witnesses:
M. B. DOYLE,
PETER FASKENS.